United States Patent
Kim et al.

(10) Patent No.: US 9,792,279 B2
(45) Date of Patent: *Oct. 17, 2017

(54) METHODS AND SYSTEMS FOR ANALYZING COMMUNICATION SITUATION BASED ON EMOTION INFORMATION

(71) Applicant: NCsoft Corporation, Seoul (KR)

(72) Inventors: Taek Jin Kim, Seongnam (KR); Jay June Lee, Seoul (KR); Jungsun Jang, Seoul (KR); Sehee Chung, Yongin (KR); Kyeong Jong Lee, Yongin (KR); Yeonsoo Lee, Seoul (KR)

(73) Assignee: NCSOFT CORPORATION, Seoul (KR)

( * ) Notice: Subject to any disclaimer, the term of this patent is extended or adjusted under 35 U.S.C. 154(b) by 120 days.

This patent is subject to a terminal disclaimer.

(21) Appl. No.: 14/799,545

(22) Filed: Jul. 14, 2015

(65) Prior Publication Data
US 2016/0210279 A1   Jul. 21, 2016

(30) Foreign Application Priority Data

Jan. 19, 2015   (KR) ........................ 10-2015-0008725

(51) Int. Cl.
*G06F 17/27*   (2006.01)
*G06F 17/24*   (2006.01)

(52) U.S. Cl.
CPC .......... *G06F 17/279* (2013.01); *G06F 17/241* (2013.01); *G06F 17/2785* (2013.01)

(58) Field of Classification Search
CPC ... G06F 17/27; G06F 17/276; G10L 15/1822; H04L 51/32

(Continued)

(56) References Cited

U.S. PATENT DOCUMENTS 8,078,450 B2 * 12/2011 Anisimovich ...... G06F 17/2755
                                                        704/2
8,458,278 B2 *  6/2013 Christie ............... G06Q 10/107
                                                        709/207

(Continued)

FOREIGN PATENT DOCUMENTS

| KR | 10-0751396 A | 8/2007 |
| KR | 10-2011-0026218 A | 3/2011 |
| KR | 10-2011-0026218 A1 | 3/2011 |

OTHER PUBLICATIONS

Yeon-Su Lee, et al. "A method for measuring Inter-Utterance Similarity Considering Various Linguistic Features," Korean Sound Conference, vol. 28, No. 1, pp. 61-69 (2009).

(Continued)

*Primary Examiner* — Olujimi Adesanya
(74) *Attorney, Agent, or Firm* — Patent Office of Dr. Chung Park

(57) ABSTRACT

Provided is a method of recommending a sticker through an emotion analysis. The method of recommending a sticker through an emotion analysis, include: by a server, performing a surface analysis on the last utterance between the first user terminal and the second user terminal; performing an emotion analysis on the last utterance using a result of the surface analysis; extracting a dialog context factor including a surface analysis result and an emotion analysis result on a certain number of continuous utterances including the last utterance between the first user terminal and the second user terminal; selecting a sticker to be recommended to the first user using the dialog context factor; and providing the selected sticker for the first user terminal.

2 Claims, 19 Drawing Sheets

(58) Field of Classification Search
USPC .......................................................... 704/9
See application file for complete search history.

(56) References Cited

U.S. PATENT DOCUMENTS

| | | | | |
|---|---|---|---|---|
| 9,042,923 | B1* | 5/2015 | Mirho | H04W 4/14 455/412.1 |
| 2002/0077135 | A1* | 6/2002 | Hyon | H04M 1/72544 455/466 |
| 2006/0122834 | A1* | 6/2006 | Bennett | G10L 15/1822 704/256 |
| 2007/0073517 | A1* | 3/2007 | Panje | H04M 1/72552 702/181 |
| 2008/0059570 | A1* | 3/2008 | Bill | G06Q 10/10 709/203 |
| 2009/0061825 | A1* | 3/2009 | Neelakantan | H04L 29/12292 455/412.1 |
| 2009/0117922 | A1* | 5/2009 | Bell | H04M 1/72552 455/466 |
| 2010/0198584 | A1* | 8/2010 | Habu | G06F 17/27 704/9 |
| 2011/0294525 | A1* | 12/2011 | Jonsson | G06F 17/27 455/466 |
| 2011/0301941 | A1* | 12/2011 | De Vocht | G06F 17/2715 704/9 |
| 2012/0246054 | A1* | 9/2012 | Sastri | G06Q 50/01 705/37 |
| 2013/0103766 | A1* | 4/2013 | Gupta | G06Q 10/107 709/206 |
| 2013/0151508 | A1* | 6/2013 | Kurabayashi | G06F 17/2223 707/723 |
| 2013/0218914 | A1* | 8/2013 | Stavrianou | G06F 17/30654 707/755 |
| 2013/0247078 | A1* | 9/2013 | Nikankin | H04N 21/44204 725/13 |
| 2014/0088954 | A1* | 3/2014 | Shirzadi | G06F 17/24 704/9 |
| 2014/0214409 | A1* | 7/2014 | Leydon | G06F 3/0236 704/9 |
| 2015/0149925 | A1* | 5/2015 | Weksler | H04L 51/063 715/752 |
| 2015/0220774 | A1* | 8/2015 | Ebersman | G06K 9/00308 382/118 |
| 2015/0286371 | A1* | 10/2015 | Degani | G06F 17/274 705/14.64 |
| 2016/0062989 | A1* | 3/2016 | Lee | G10L 25/63 704/9 |
| 2016/0210116 | A1* | 7/2016 | Kim | G06F 17/276 |
| 2016/0210117 | A1* | 7/2016 | Kim | G10L 15/26 |
| 2016/0210962 | A1* | 7/2016 | Kim | G06F 17/27 |
| 2016/0210963 | A1* | 7/2016 | Kim | G10L 15/1822 |

OTHER PUBLICATIONS

Gumwon Hong et al., "A Korean Mobile Conversational Agent System," Korea Computer Science Conference, vol. 13, Book 6, 2008.
Kim, Jun Hyun et al. "Automated Emotion Recommendation Module Based on Bigram-Signature Using Text Mining," Korean Computer Conference, pp. 1632-1634, 2014.

* cited by examiner

FIG. 3

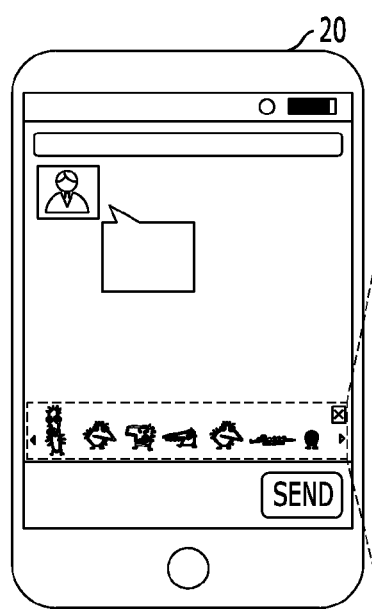

☐ RECOMMENDATION EXAMPLE #1:
  RELATION WITH THE OTHER PARTY
  • WHEN THE OTHER PARTY IS A SUPERIOR

• WHEN THE OTHER PARTY IS A CLOSE FRIEND

☐ RECOMMENDATION EXAMPLE #2: DIALOGUE EMOTION
  WHEN A USER TALKS ABOUT HARD WORK TO A SUPERIOR

☐ RECOMMENDATION EXAMPLE #3: DIALOGUE SITUATION
  APPROPRIATE RESPONSE TO UTTERANCE OF THE
  OTHER PARTY WHEN FRIEND SAYS TO GIVE A TREAT

☐ RECOMMENDATION EXAMPLE #4: PERSONAL PREFERENCE
  USER WHO MAINLY USE STICKERS
  EXPRESSED AS OVERACTION

FIG. 14

SURFACE FACTOR

| feature | feature EXPRESSION EXAMPLE |
|---|---|
| WORD(MORPHEME) n-gram | TriMorph=보_겠_습니다 |
| PARTS OF SPEECH n-gram | PosTrigram=VX_EP_EF |
| PAIR OF WORD-PART OF SPEECH | MorphPos=습니다_EF |
| LAST WORD | LastEojeol=보겠습니다! |
| LAST VERB | LastVerb=만들 |
| LAST ADVERB | LastAdverb=어서 |
| LAST AUXILIARY PREDICATE | LastVerb=보 |
| LAST ENDING | LastEomi=습니다 |
| SUBJECT | Subject=나 |
| LENGTH | Length=M |
| FORMAL MORPHEME SEQUENCE | FunMorphSeq=이_어_이_아_보_겠_습니다 |
| FORMAL MORPHEME SET | FunMorphSet=겠_보_습니다_아_어_이 |
| FORMAL PART OF SPEECH SEQUENCE | FunPosSeq=JKS_EC_VX_EC_VX_EP_EF |
| FORMAL PART OF SPEECH SET | FunPosSet=EC_EF_EP_JKS_VX |
| ABUSIVE LANGUAGE, EMOTICON | ExistExp=JOY, NumExp=JOY:1, ExpWord=JOY_^_^ |

FIG. 15

DIALOGUE CONTEXT FACTOR

| feature group | feature EXPRESSION EXAMPLE |
|---|---|
| FEATURE: SURFACE FEATURE OF LAST UTTERANCE OF USER | PrevMy XXXXXX |
| FEATURE: SURFACE FEATURE OF UTTERANCE BEFORE LAST OF USER | BeforeLastMy XXXXXX |
| FEATURE: SURFACE FEATURE OF LAST UTTERANCE OF OTHER PARTY | PrevOpp XXXXXX |
| FEATURE: SURFACE FEATURE OF UTTERANCE BEFORE LAST OF OTHER PARTY | BeforeLastOpp XXXXXX |
| DIALOGUE ACT HISTORY - order 1 | DialActUnigram=Opp_AcceptRequest |
| DIALOGUE ACT HISTORY - order 2 | DialActBigram=My_Request_Opp_AcceptRequest |
| DIALOGUE ACT HISTORY - order 3 | DialActTrigram=Opp_Disconfirm_My_Request_Opp_AcceptRequest |
| EMOTION HISTORY - order 1 | EmotionUnigram=Opp_None |
| EMOTION HISTORY - order 2 | EmotionBigram=My_None_Opp_None |
| EMOTION HISTORY - order 3 | EmotionTrigram=Opp_None_My_None_Opp_None |

EMOTION CLASSIFICATION FACTOR

| feature | feature EXPRESSION EXAMPLE |
|---|---|
| DIALOGUE ACT ANALYSIS RESULT OF CURRENT UTTERANCE | CurMyDialAct = AcceptRequest |

METHODS AND SYSTEMS FOR ANALYZING COMMUNICATION SITUATION BASED ON EMOTION INFORMATION

CROSS-REFERENCE TO RELATED APPLICATIONS

This U.S. non-provisional patent application claims priority under 35 U.S.C. §119 of Korean Patent Application No. 10-2015-0008725, filed on Jan. 19, 2015, the entire contents of which are hereby incorporated by reference.

BACKGROUND OF THE INVENTION

The present invention relates to a method of recommending stickers during a dialogue through a social network service or an instant messenger, and more particularly, to a method of recommending stickers that are appropriate for a context through a history analysis of emotion emerging during the dialogue.

Emoticons are being used to express the emotional state of a user during a dialogue through a social network service or an instant messenger.

In the past, emoticons (e.g., OTL, TT, ^^; etc.) written with texts was added to the end of the utterance, but in recent years, emoticons of graphic image types are being widely used. Hereinafter, the term "utterance" refers to at least one of text and image.

While inputting dialogue contents, a user opens an emoticon selection window and then selects and inputs an appropriate emoticon. In order to more conveniently perform the foregoing process, a technology of automatically converting and expressing a text inputted by a user into an emoticon has been also developed.

FIG. 1 is a view illustrating an emoticon displayed on a well-known personal computer messenger (NateOn).

In the well-known messenger shown in FIG. 1, when a specific keyword is inputted, the corresponding text is automatically converted into an emoticon corresponding to the specific keyword. In FIG. 1, when a user inputs a word "present", it can be seen that the word "present" is automatically converted into the emotion corresponding to the present.

However, when a specific keyword is simply inputted, this related art technology merely expresses an emoticon matched with the specific keyword in advance. Accordingly, in many cases, emoticons are expressed in regardless of dialogue contents or contexts and emotional state, even in an inappropriate manner in the light of the dialogue situation.

Accordingly, there has been developed a technology of recommending a more appropriate emoticon in consideration of a situation such as the emotional state of a user, surpassing the emoticon conversion technology through simply keyword matching.

Korean Patent Application Publication No. 10-2011-0026218 discloses "apparatus and method for inputting text message and its program stored in recording medium", which extract words indicating the emotional state from dialogue contents that are inputted, and select an emoticon matching with the emotional state using the extracted words.

However, this technology is also merely to select emoticons matching with the corresponding keywords from emoticons by analyzing inputted texts when keywords representing the emotional state such as happiness and sadness show. For example, in case where words indicating the emotional state of a user are ironically used unlike the dictionary definition of the word, there is a limitation in that recommended emoticons are not appropriate for the situation.

Also, since the analysis is performed by the unit of utterance, there is a limitation in that the recommendation considering the context is impossible.

PRIOR ART DOCUMENT

Patent Document

Document 1. Korean Patent Application Publication No. 10-2011-0026218 entitled "Apparatus and method for inputting text message and its program stored in recording medium"

Document 2. Korean Patent No. 10-0751396 entitled "System and method for auto conversion emoticon of SMS in mobile terminal"

Non-Patent Document

Document 3. Jun-Hyuk Kim, Young-Woong Park, Seul-Bi Ha, and Yong-Seok Choi, "Automated Emotion Recommendation Module Based on Bigram-Signature Using Text Mining", Korean Computer Conference, PP 1632-1634, 2014.

Document 4. Yeon-Su Lee, Joong-Hui Shin, Gum-Won Hong, Young-In Song, Do-Gil Lee, and Hae-Chang Rim, "A Method for Measuring Inter-Utterance Similarity Considering Various Linguistic Features", Korean Sound Conference, Vol. 28, No. 1, PP 61-69 (2009).

Document 5. GumWon Hong, Yeon-Soo Lee, Min-Jeong Kim, Seung-Wook Lee, Joo-Young Lee, and Hae-Chang Rim, "A Korean Mobile Conversational Agent System", Korea Computer Science Conference, Vol. 13, Book 6, 2008.

SUMMARY OF THE INVENTION

The present invention provides a method of recommending a sticker so as to allow long-distance users to use the sticker by including the sticker in an utterance in a messenger or a social network service in which long-distance users exchange dialogues with each other, and more specifically, a method of understanding a context by the unit of dialogue in which a plurality of utterances continue, not by the unit of utterance, and recommending an appropriate sticker in accordance with the context.

The present invention also provides a method of recommending an appropriate sticker in accordance with a context, by analyzing utterances to determine the type and strength of emotion and configuring dialogue situation information using the emotion history and the surface analysis result on a plurality of continuous utterances.

Embodiments of the present invention methods of recommending a sticker through an emotion analysis, include: by a server connected to a first user terminal and a second user terminal through a network, accumulating utterance data through dialogue act and emotion tag attachment to a corpus; performing a surface analysis on the last utterance between the first user terminal and the second user the terminal; performing a emotion analysis on the last utterance using a result of the surface analysis; extracting a dialogue context factor including a surface analysis result and an emotion analysis result on a certain number of continuous utterances including the last utterance between the first user terminal and the second user terminal; selecting a sticker to be recommended to the first user using the dialogue context factor; and providing the selected sticker for the first user terminal.

In some embodiments, the performing of the surface analysis may include: correcting a colloquial style of sentences of an input utterance; analyzing morphemes of the corrected utterance and attaching parts of speech to the corrected utterance; and extracting keywords based on the analyzed morphemes and the attached parts of speech.

In other embodiments, in the performing of the emotion analysis, an emotion dependence strength may be determined by: determining the type of emotion about the last utterance using the result of the surface analysis on the last utterance; and determining the strength of emotion by adding up emotion-adverb correlation values with a weight using an already-established emotion type-adverb correlation dictionary when an adverb appears in the utterance, and in the performing of the emotion analysis, an emotion independence strength may be determined by: determining whether an adverb included in an already-established emotion degree adverb dictionary appears, in regard to pairs of morphemes and parts of speech acquired from the result of the surface analysis on the last utterance; and determining the strength of emotion in proportion to the frequency of the adverb included in the already-established emotion degree adverb dictionary.

In other embodiments of the present invention, systems of recommending a sticker through an emotion analysis, include: a natural language processing unit performing a surface analysis on an utterance between a first user terminal and a second user terminal; an analysis unit performing an emotion analysis on the corresponding utterance using a result of the surface analysis and extracting a dialogue context factor including a surface analysis result and an emotion analysis result on a certain number of continuous utterances including the last utterance between a first user terminal and a second user terminal; a sticker recommending unit selecting a sticker to be recommended to the first user using the dialogue context factor; and an emotion strength analysis resource including an emotion type-adverb correlation dictionary that is already constructed, In some embodiments, the emotion type-adverb correlation dictionary may include a list of adverbs emphasizing the type of the corresponding emotion for each type of emotion and an emotion type-adverb correlation that is an indicator representing the degree at which the corresponding adverb emphasizes the type of the corresponding emotion.

In other embodiments, the emotion degree adverb dictionary may include a list of adverbs representing the emotion degree.

In further embodiments, the analysis unit may determine the type of emotion in regard to the last utterance using the result of the surface analysis on the last utterance and determine the emotion dependence strength by adding up emotion-adverb correlation values with a weight in regard to an adverb appearing in the utterance, or may determine whether an adverb included in the emotion degree adverb dictionary appears in the last utterance using the result of the surface analysis on the last utterance, and determine the emotion independence strength in proportion thereto.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 3 is a view illustrating examples of recommending stickers in consideration of relation with the other dialogue party, dialogue emotion, dialogue situation, and personal preference;

FIG. 14 is a view illustrating surface factors;

FIG. 15 is a view illustrating dialogue context factors;

DETAILED DESCRIPTION OF PREFERRED EMBODIMENTS

Figure 1:
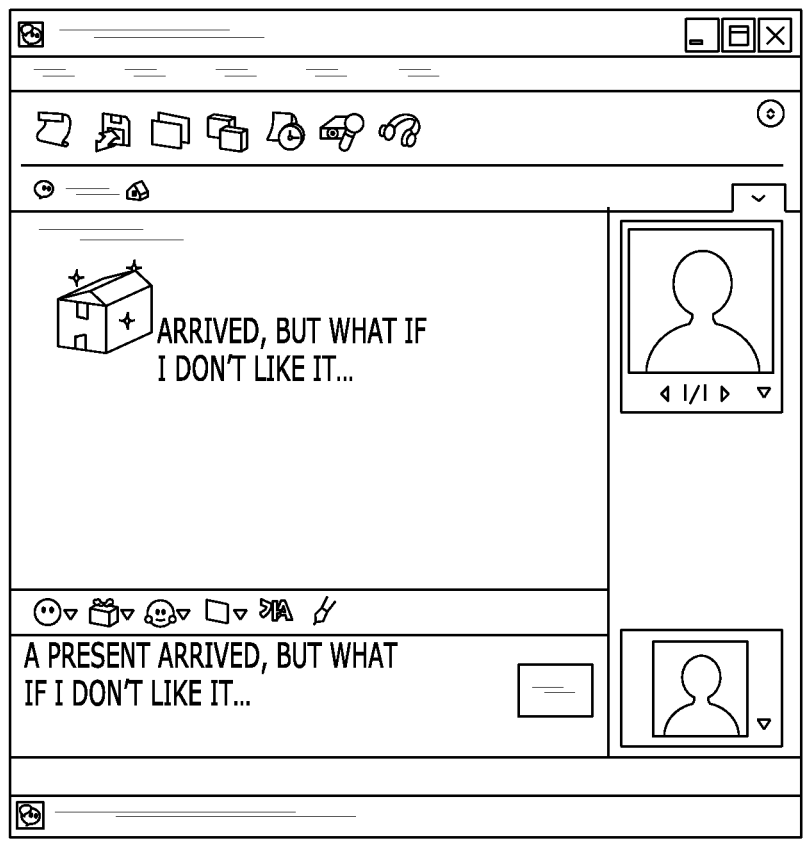
FIG. 1 is a view illustrating a typical automatic emoticon conversion technology.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, exemplary embodiments of the present invention will be described in detail with reference to the accompanying drawings. In order to clarify the present invention, a description irrelevant to the constitution of the present invention will be omitted, and in the drawings, like reference numerals refer to like elements throughout.

Since the terms "including", "comprising", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

In the detailed description of the invention and claims, components named as "~unit", "~part", "~module", and "~block" mean units that process at least one function or operation, and each of which can be implemented by software, hardware, or a combination thereof.

Hereinafter, a sticker denotes a graphic image used in a dialogue on a messenger or social network service. The sticker can be used interchangeably with an emoticon.

Hereinafter, an attached sticker denotes a sticker that accompanies a dialogue sentence inputted by a user and is attached to the inputted sentence.

Hereinafter, a responsive sticker denotes a sticker used to respond to a sticker used by the other party in the last dialogue or the last dialogue contents inputted by the other party.

In this embodiment, the attached sticker may be a sticker recommended for a dialogue sentence inputted by the other party, and the responsive sticker may be a sticker recommended for a user (not the other party) in order to respond to a sticker used by the other party or the last dialogue sentence inputted by the other party.

Hereinafter, the attachment of a sticker denotes expressing the graphic image of the corresponding sticker at the front or rear of a dialog box or inputted dialogue contents or in the middle of the dialog box or inputted dialogue contents.

Hereinafter, an utterance denotes a basic unit of dialogue inputted by a user on a messenger or a social network service. Generally, the utterance may be performed by inputting dialogue contents in a form of text into a dialogue input window and then pushing a button "Send".

Hereinafter, a dialogue situation denotes a state flow of dialogue which emerges through the intention of utterance, emotion, and keyword analysis.

Hereinafter, a speech act denotes the intention of utterance.

Hereinafter, dialogue situation information includes dialogue act information (information on dialogue act category) acquired from dialogue act analysis, emotion information analysis and keyword extraction results on a series of continuous utterances, emotion information (information on emotion category and emotion strength), and keywords.

Hereinafter, utterance data denotes data accumulated through an analysis on a dialogue act attachment corpus and an emotion attachment corpus. The utterance data may include a dialogue act category change of a plurality of continuous utterances, emotion types, and emotion strength changes. Each utterance included in the utterance data may be analyzed so as to have dialogue act information, emotion information and keywords, and may also be stored in a form of dialogue situation information. Meanwhile, the utterance data may further include information about whether each utterance corresponds to a response or starts a theme.

Hereinafter, surface factors may be defined in order to describe formal features of an utterance, and may be obtained by correcting a colloquial style of sentence in regard to a certain utterance, analyzing morphemes, and attaching parts of speech.

Hereinafter, an emotion classification factor may be defined to describe the type and strength of emotion of an utterance, and may be obtained from the dialogue act analysis.

Hereinafter, a dialogue context factor may be defined to describe the context of a plurality of continuous utterances, and may include a surface factor in regard to the last several utterances of a user, a surface factor in regard to the last several utterances of the other dialogue party, and a history of dialogue act information and emotion information.

Figure 2:
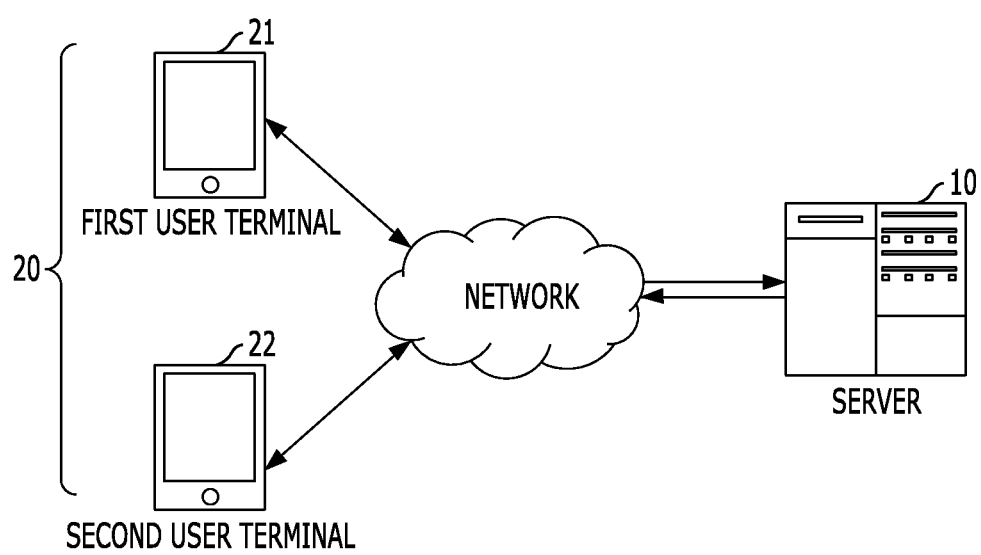
FIG. 2 is a view illustrating a relationship of a server and user terminals.

FIG. 2 is a view illustrating a relationship of a user terminal 20 and a server 10.

The user terminal 20 may be connected to the server 10 through a network, and may correspond to a unit for inputting dialogue contents or expressing an utterance inputted from the other party.

A user may exchange a visual form of messages including texts and images with other users via the server 10 using the user terminal 20.

Examples of the user terminal 20 may include smart phones and personal computers as the unit for performing the foregoing functions. In addition, units that can be connected to the network (e.g., Internet) and enable a visual type of communication for a user should be construed as being included in the user terminal 20.

Hereinafter, a first user may be in dialogue with the other party by exchanging messages with the other party, and a first user terminal 21 may correspond to a unit that enables the first user to perform the visual type of communication.

A second user may be the other part in dialogue with the first user, and a user terminal 22 may be a terminal used by the second user for dialogue.

The server 10 may relay messages between the first user and the second user, and may recommend attached stickers and responsive stickers to first user.

Hereinafter, it will be described that the server 10 recommends stickers to the first user, but this distinguishment between the first user and the second user is merely for better understanding as a matter of convenience. Accordingly, it is natural that the server 10 can recommend stickers to both users.

In FIG. 2, although only a single server is shown, a server group including a plurality of servers divided in accordance with functions thereof may be provided.

For example, the server 10 may also include a messenger server for relaying a dialogue between the first user terminal 21 and the second user terminal 22, a sticker recommendation server for analyzing a dialogue and recommending stickers, and a server for providing a social network service.

Also, the server 10 may be connected to an external social network service server in order to provide a sticker recommendation result for the user terminal 20 via the external server.

The present invention may be implemented by the sticker recommendation method executed in the server 10, or may be implemented in a form of the server 10 for executing the sticker recommendation method. Also, the present invention may be implemented in a form of computer program executed in the server 10.

The server 10 may select and recommend appropriate stickers during the dialogue of users through the following process.

First, the server 10 may collect dialogue contents from the first user terminal 21 and the second user terminal 20, and may analyze the dialogue situation by segmenting and analyzing an utterance.

Meanwhile, the server 10 may select an appropriate sticker candidate group by retrieving similar dialogue situations from utterance data which are already collected and analyzed using the established dialogue situation classification system and dialogue situation information, and may determine the ranking of stickers based on the situation and preference and finally recommend stickers to a user.

That is, unlike a related art in which one-to-one matching (recommending identical sticker in regard to identical keyword) is performed through simple comparison of keywords, even though identical keyword is checked from the parsing of dialogue contents, different stickers may be recommended in accordance with the dialogue situation, relation with the other party, or personal preference of a user.

FIG. 3 is a view illustrating examples of recommending, by the server 10, different sticker groups in accordance with the relation with the other party, dialogue emotion, dialogue situation, and personal preference in spite of identical dialogue contents.

In Example #1 of FIG. 3, when the other dialogue party is a superior or a close friend, it can be seen that different sticker groups are recommended.

In case of a superior, stickers giving an excessively unceremonious feeling may be excluded, and stickers appropriate for dialogue with a superior may be mainly recommended.

On the other hand, when the other party is a close friend, stickers that can be used conveniently instead of sticking to formality may be mainly recommended.

In Example #2 of FIG. 3, an appropriate sticker group may be recommended in accordance with the emotional state of a user.

When a user talks about hard and sad company works, the server 10 may catch the emotional state of a user, and may recommend a sticker group matching with the emotional state as shown in Example #2 of FIG. 3.

In Example #3 of FIG. 3, an appropriate sticker group may be recommended in accordance with the dialogue situation.

When the other dialogue party says to give a treat at the last inputted dialogue contents, stickers appropriate for the talk of the other dialogue party may be recommended as the dialogue contents of a user.

In Example #4 of FIG. 3, the ranking of selected sticker groups may be again determined and then recommended in accordance with the personal preference.

From the analysis of metadata of stickers that are much used at ordinary times by a user, if a user mainly use stickers expressed as overaction, then the server 10 may correct and provide a sticker group for the first user terminal 21 such that stickers expressed as overaction can be preferentially exposed among the sticker group selected in consideration of the dialogue situation, the relation with the other party, and the emotional state.

Figure 4:
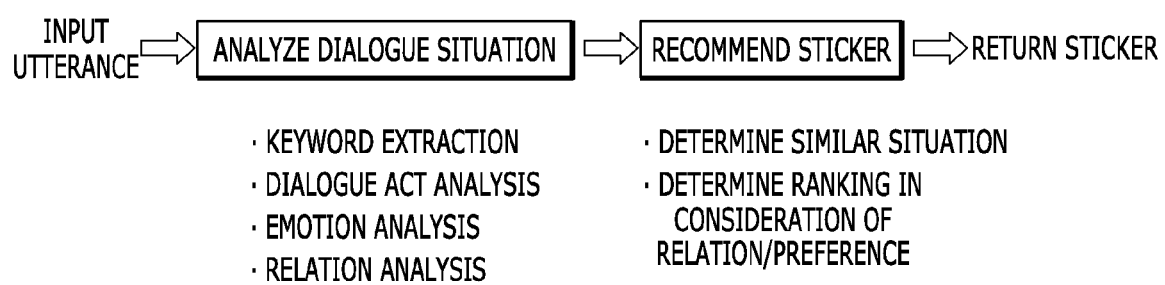
FIG. 4 is a view illustrating a process of recommending stickers by analyzing collected utterances.

As shown in FIG. 4, these series of sticker recommendation processes may be roughly divided into a dialogue situation analysis process and a sticker recommendation process.

FIG. 4 is a view illustrating a process of recommending stickers by analyzing collected utterances.

In the dialogue situation analysis process, through natural language processing, colloquial style of sentences may be corrected, and morphemes may be analyzed. Also, parts of speech may be attached.

As a result, the surface factors in regard to unit utterance may be extracted.

After the surface factors in regard to utterance are analyzed, dialogue act analysis and emotion analysis may be performed using the analysis result of the surface factors.

Also, the relationship between dialogue parties may be analyzed through the analysis on pairs of dialogues that are exchanged.

Meanwhile, the server 10 may search for the most similar dialogue situation using a separate dialogue situation classification system.

The dialogue situation may be roughly divided in accordance with intention/emotion/relation, which are overall considered.

"Intention" may be classified into various types from the general-purpose or social formality viewpoint of dialogue. For example, the intention may be classified into "praise", "help request", "greeting", and "boast".

"Emotion" may be divided into various categories according to the strength of emotion. For example, the emotion may be classified into categories such as "happiness" and "sadness", and may be divided in accordance with the strength of emotion such as "very", "normally", and "slightly".

"Relation" may be classified in accordance with the relationship between subordinates and superiors and the degree of intimacy. For example, the relation may be classified into "superior", "subordinate", "familiarity", and "unfamiliarity".

When the dialogue situation is analyzed through the foregoing process, the server 10 may recommend stickers by a sticker recommendation algorithm in the sticker recommendation process.

Hereinafter, these series of processes will be described in detail with reference to the accompanying drawings.

First, in the dialogue situation analysis process, the server 10 may not analyze only a single utterance, but also may analyze the flow of two-way dialogue between dialogue parties.

The dialogue situation analysis process may be further divided into an utterance unit analysis process and a dialogue unit analysis process.

In the utterance analysis process, the analysis of vocabulary level may be performed regardless of the context.

In the utterance analysis process, colloquial style of sentences may be first corrected. In the correction of the colloquial style of sentences, word spacing, misspelling and slang may be corrected. Emoticons may be recognized to be converted into vocabularies corresponding thereto.

Meanwhile, morpheme analysis and attachment of parts of speech may be performed, and thus keywords may be extracted.

In this utterance analysis process, well-known research results may be utilized.

Thereafter, in the dialogue unit analysis process, dialogue act analysis, emotion analysis, and relation analysis may be performed. Thus, the server 10 may generate dialogue situation information.

In the dialogue unit analysis process, the analysis may be performed in consideration of the two-way dialogue context, not the utterance unit, and the situation classification system that is already constructed during the dialogue unit analysis may be used.

Figure 5A:
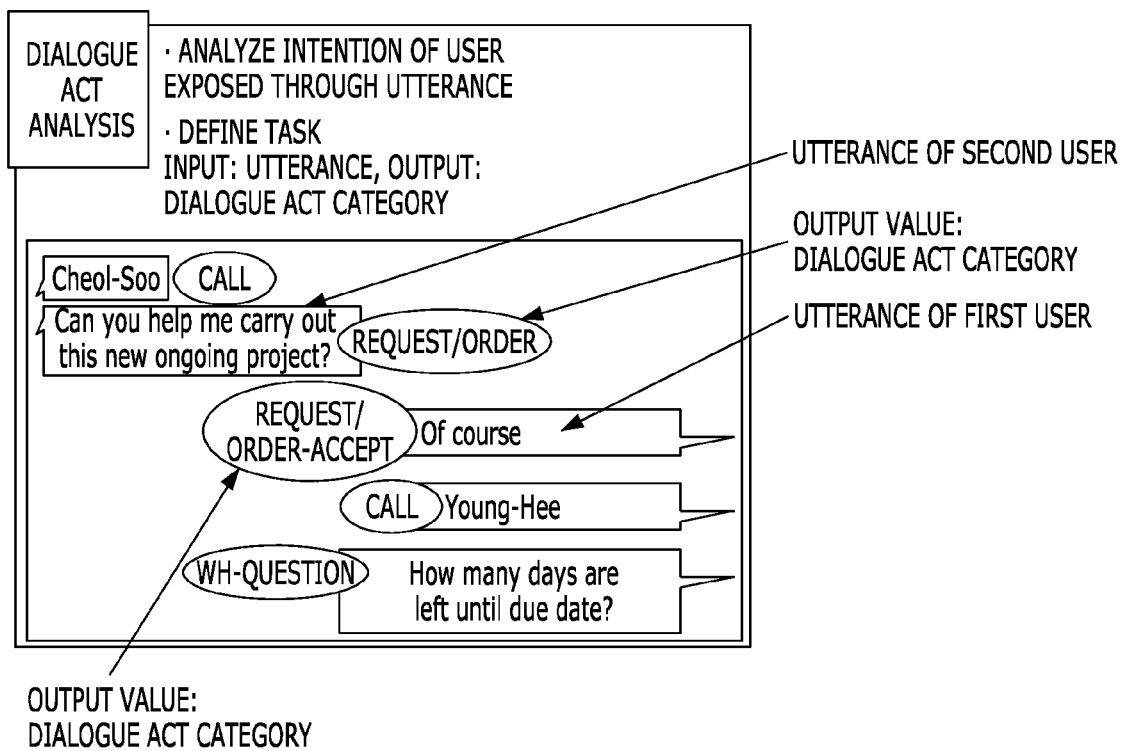
FIG. 5A to 5C are views illustrating dialogue act analysis, emotion analysis, and relation analysis, respectively.
Figure 5B:
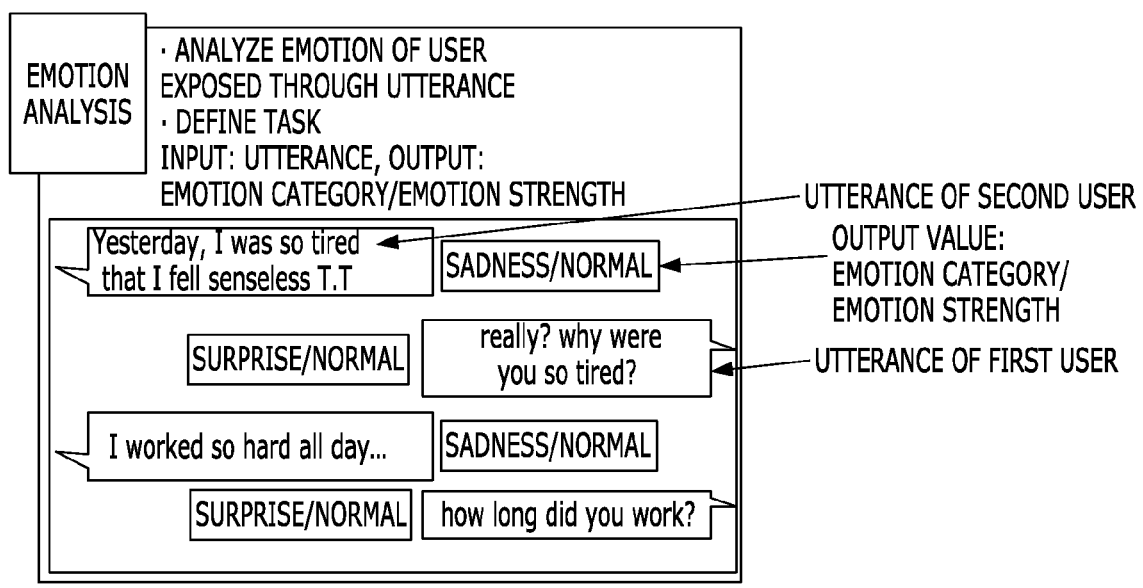
Figure 5C:
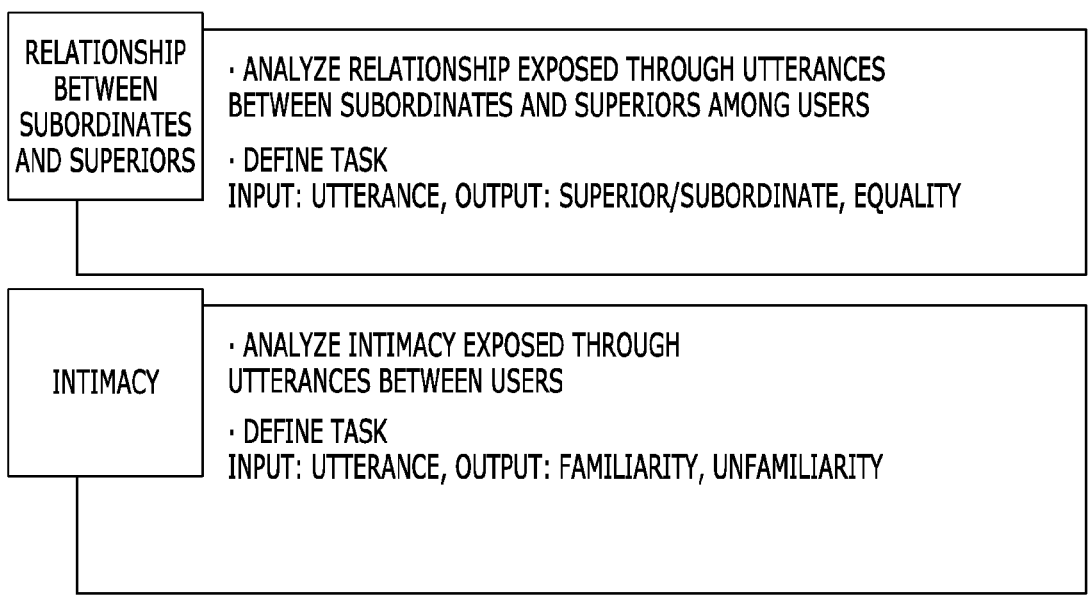

FIG. 5A to 5C are views illustrating dialogue act analysis, emotion analysis, and relation analysis, respectively.

As shown in FIG. 5A, the intention of a user, exposed through utterances, may be analyzed in the dialogue act analysis process.

The input value may be "utterance", and the output value may be "dialogue act category".

In FIG. 5A, when the first user inputs an utterance "Can you help me carry out this new ongoing project?", it can be seen that the output value corresponding thereto is "request/order" that is one of predefined dialogue act categories.

As shown in FIG. 5B, the emotion of a user, exposed through utterances, may be analyzed in the emotion analysis process.

The input value may be "utterance", and the output value may be "emotion category and emotion degree".

In FIG. 5B, when the first user inputs an utterance "Yesterday, I was so tired that I fell senseless. TT", it can be seen that the output value corresponding thereto is "sadness" and "normal". That is, the emotion category may be analyzed as "sadness", and the emotion degree may be analyzed as "normal".

As shown in FIG. 5C, the relationship between subordinates and superiors and the intimacy between users, which are exposed through utterances, may be analyzed in the relation analysis process.

The input value may be "utterance", and the output value of the analysis result on the relationship between subordinates and superiors may be "subordinates and superiors" or "equality". The output value of the analysis result on the intimacy may be "familiarity" or "unfamiliarity".

Thus, when the dialogue situation information is generated through the dialogue act analysis, the emotion analysis and the relation analysis, the server 10 may retrieve similar situation using the situation classification system.

The dialogue situation classification system may be divided into a dialogue act classification system and an emotion classification system.

The dialogue act classification system may be obtained by classifying the dialogue act, i.e., intention of dialogue into various types from the general-purpose or social formality viewpoint of dialogue.

Figure 6:
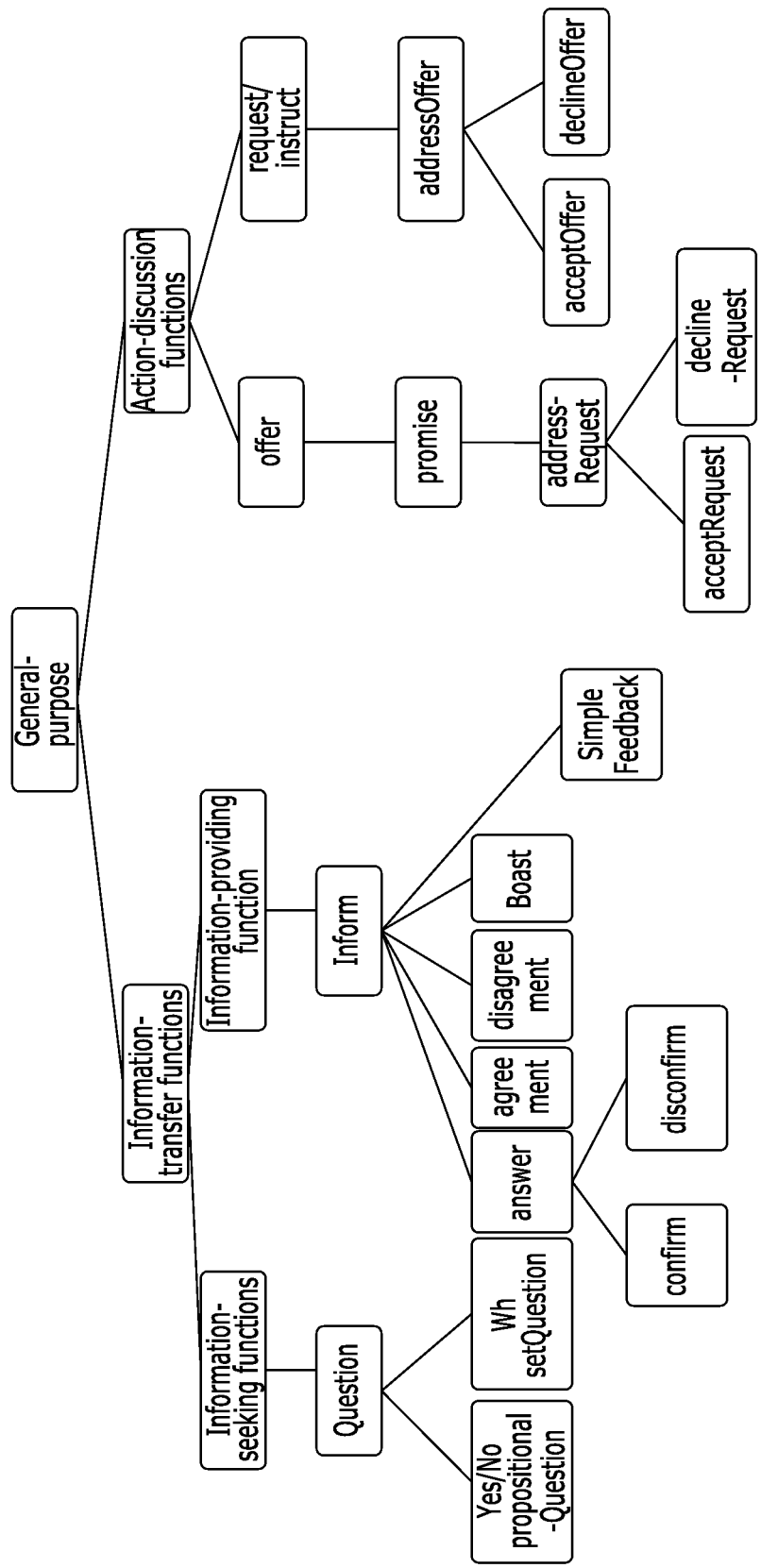
FIG. 6 is a view illustrating a classification system of dialogue acts from the general-purpose viewpoint of dialogue.

FIG. 6 is a view illustrating a classification system of dialogue acts from the general-purpose viewpoint of dialogue.

As shown in FIG. 6, the types such as "Yes-No question", "Wh-question", "Answer-confirm", "Answer-disconfirm", "Agreement", "Disagreement", and "Boast" may be shown.

In FIG. 6, the dialogue act classification system may reflect the hierarchical structure and the classification standards of ISO standard classification system, and may be established so as to comply with Korean language dialogue intention classification. The classification corresponding to emotion may be removed from the dialogue act classification system.

Figure 7:
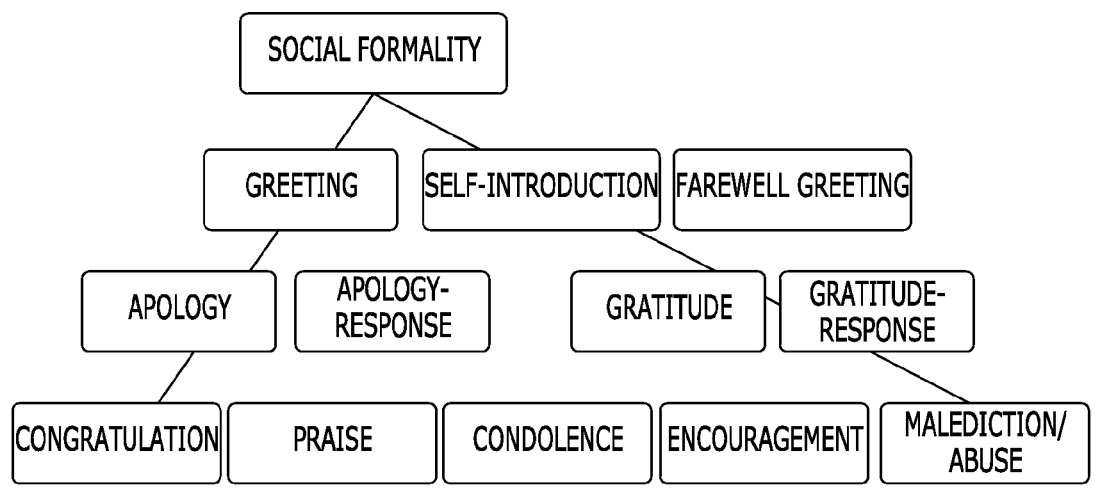
FIG. 7 is a view illustrating a classification system of dialogue acts from the viewpoint of social formality.

The dialogue act classification system of FIG. 7 may be a separate classification system obtained by considering factors of the dialogue attitudes frequently emerging in a messenger service, in addition to the dialogue general-purpose classification system of FIG. 6.

In FIG. 7, the factors of the dialogue attitudes may include "greeting", "apology", "gratitude", "congratulation", "condolence", "encouragement", and "malediction".

The dialogue act classification system of FIG. 7 may correspond to a classification system of modalities of dialogue.

Figure 8:
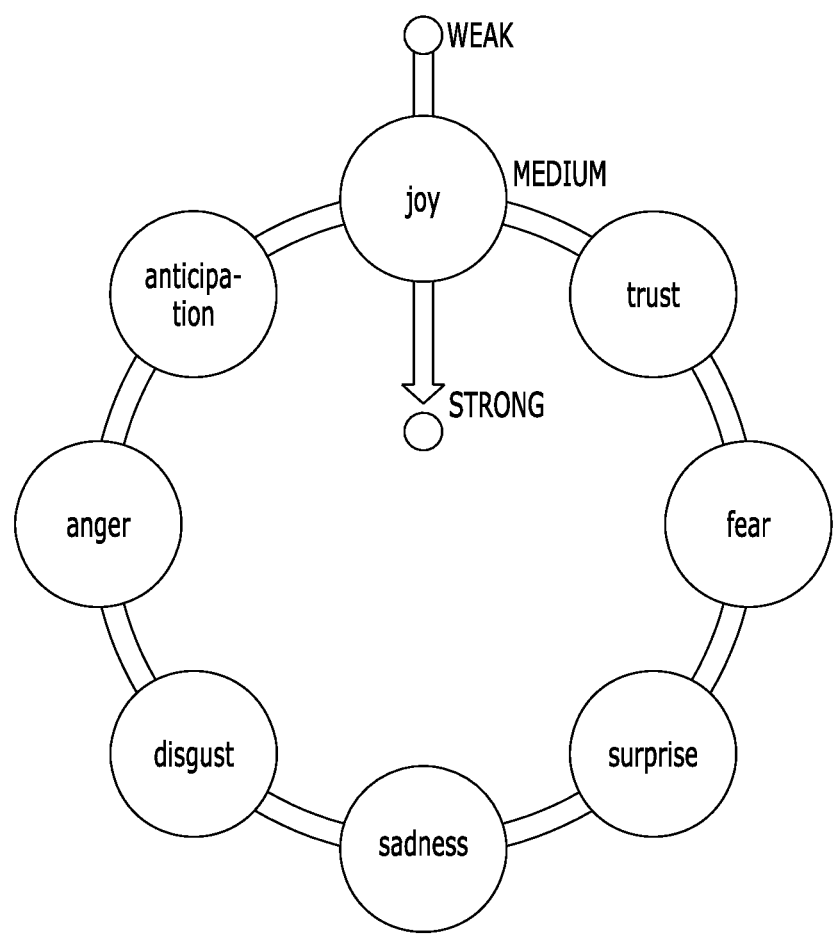
FIG. 8 is a view illustrating a classification system of emotion according to type and degree.

FIG. 8 is a view illustrating a classification system of emotion according to type and degree.

The emotion classification system of FIG. 8 may be obtained by referring to well-known emotion classification models, and may be divided into nine emotion categories including "neutral emotion", i.e., emotionless state.

Here, each emotion category may be divided into strong, medium, and weak in accordance with the emotion strength.

Next, in the sticker recommendation process, the server 10 may retrieve a similar situation by applying the generated dialogue situation information to the dialogue act classification system and the emotion classification system.

As shown in FIG. 4, the sticker recommendation process may include a similar situation retrieval process and a relationship and preference-based ranking determination process.

In the similar situation retrieval process, the most similar situation may be selected from utterance data that are already analyzed and stored based on the most probable dialogue act flow using the dialogue situation information.

Also, it may be determined whether an utterance starts a theme or corresponds to a response.

Each situation may be beforehand matched with sticker candidate groups according to whether an utterance starts a theme or corresponds to a response. In the preference-based ranking determination process, the ranking of the matched sticker candidate groups may be determined.

Appropriate stickers may be preferentially exposed according to the suitability based on the relationship with the other party, and may be preferentially exposed according to the suitability based on the preference of a user.

The sticker recommendation as illustrated in FIG. 3 may be achieved through these series of processes.

The method of recommending stickers through emotion analysis according to the embodiment of the present invention may provide a more detailed process of acquiring dialogue context factors using the analysis result on a plurality of continuous utterances while performing the surface analysis on the utterance and extracting emotion classification factor using the surface analysis result.

Hereinafter, the method of recommending stickers through emotion analysis according to the embodiment of the present invention will be described in detail with reference to FIGS. 9 to 16.

Figure 9:
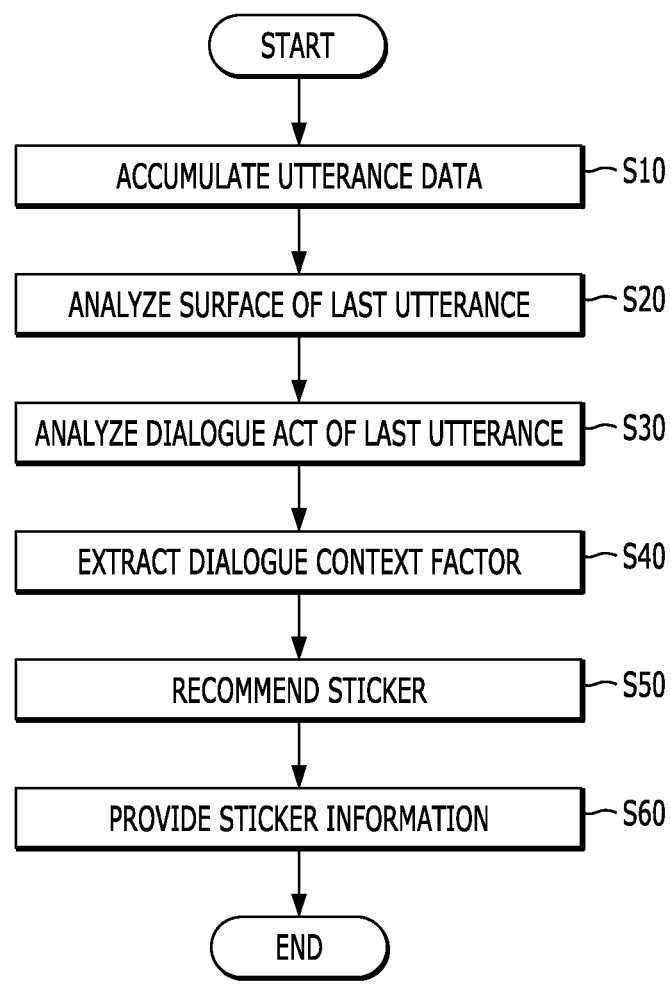
FIG. 9 is a flowchart illustrating a method of recommending stickers through emotion analysis described in time-series according to an embodiment of the present invention.

FIG. 9 is a flowchart illustrating a method of recommending stickers through emotion analysis described in time-series according to an embodiment of the present invention.

As shown in FIG. 9, the server 10 may accumulate utterance data through dialogue act and emotion tag attachment to corpuses (S10).

Figure 10:
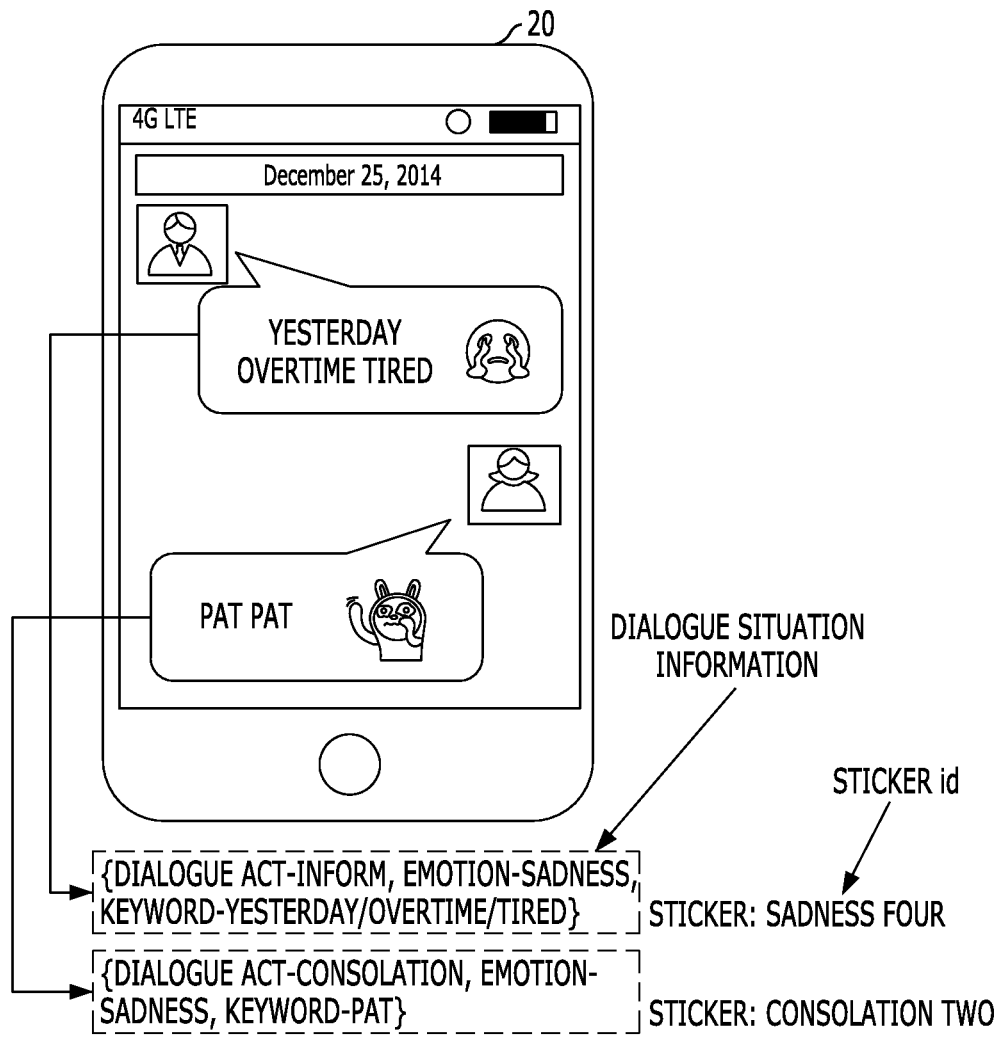
FIG. 10 is a view illustrating a process of generating a dialogue situation and sticker information combination from corpus.
Figure 11:
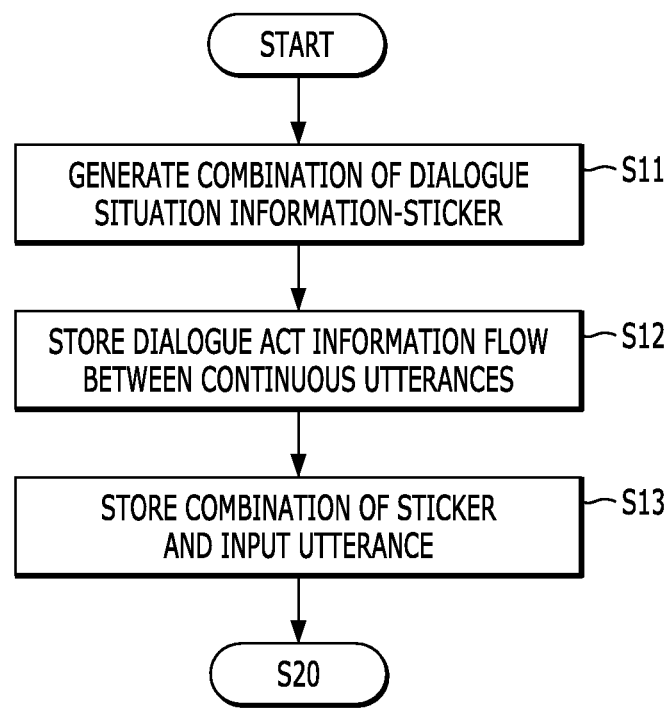
FIG. 11 is a flowchart illustrating a process of accumulating utterance data through corpus machine learning.

FIGS. 10 and 11 illustrate a process of performing machine learning from corpus to generate dialogue situation information and indexing for similarity determination of stickers of utterances.

Operation S10 may be described in detail as shown in FIG. 11. First, the server 10 may generate dialogue situation information from utterances to which stickers are attached, and may generate a combination of dialogue situation information and sticker (S11).

As illustrated in FIG. 10, a process of attaching dialogue act/emotion/keyword tags through the analysis about corpuses and generating the dialogue situation information can be shown.

The utterance expressed at the upper end of FIG. 10 is "I'm so tired because I worked overtime yesterday (sticker)". The dialogue situation information obtained from the analysis result on the utterance may include "{dialogue act-inform, emotion-sadness, and keywords-yesterday/overtime/tired}". Also, the corresponding utterance may have a sticker ID, "sadness 4" attached thereto.

Accordingly, a combination of dialogue situation information and sticker like "{dialogue act—inform, emotion—sadness, and keywords—yesterday/overtime/tired} sticker: sadness 4" may be generated.

Thereafter, the server 10 may index and store the flow of emotion information between continuous utterances (S12).

In FIG. 10, the emotion information of the upper utterance is "sadness", and the emotion information of the next utterance is also "sadness". Accordingly, the flow of emotion information may be stored as "sadness-sadness".

When the same emotion type repetitively emerges, it can be expected that the strength of the corresponding emotion increases.

Next, a combination of a sticker and an input utterance may be indexed into a sticker ID to be stored (S13).

Through learning about corpuses, the attachment relationship between stickers and utterances may be indexed and stored by sticker ID. Thus, the correlation and similarity between utterances and stickers can be numerically calculated using emotion information and keywords of utterances.

Thus, the learning to corpuses and the construction of utterance data may be completed.

Thereafter, the server 10 may collect and analyze utterances between the first user terminal 21 and the second user terminal 22. When there is a new utterance, the server 10 may first perform surface analysis on the present utterance, i.e., the last utterance (S20).

Figure 12:
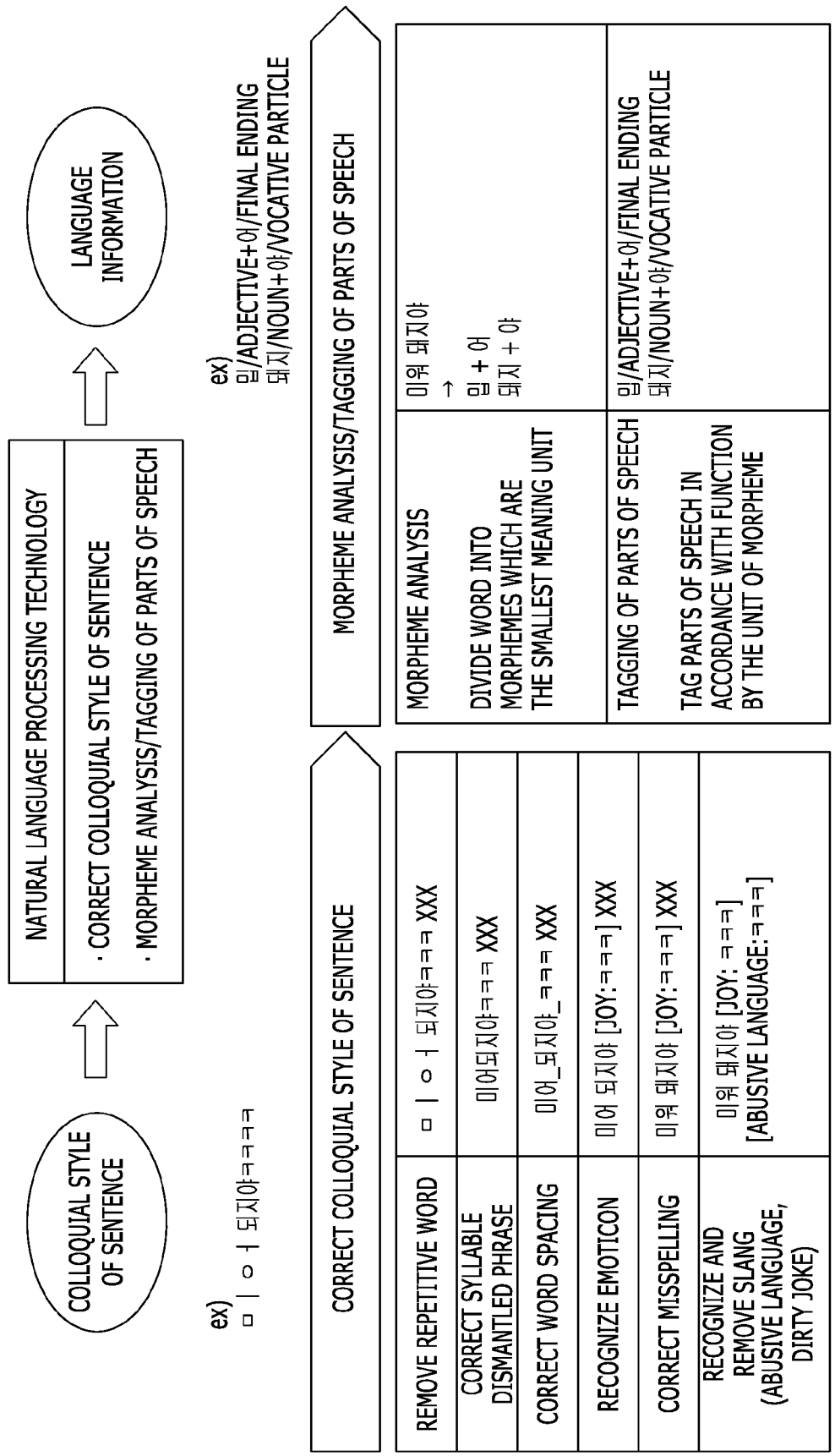
FIG. 12 is a view illustrating a method of processing natural language utterance analysis.
Figure 13:
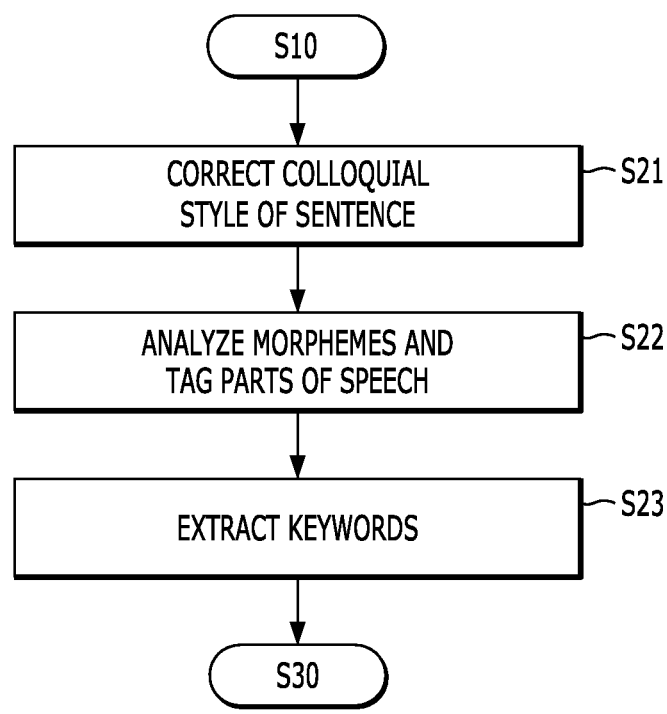
FIG. 13 is a view illustrating a natural language utterance analysis process.

FIGS. 12 and 13 further illustrate a surface analysis process of each utterance through natural language utterance analysis by the server 10.

As shown in FIG. 13, in the surface analysis process, the server 10 may correct colloquial style of sentences in regard to utterances that are inputted (S21).

As illustrating in FIG. 12, an inputted utterance is "미 1 ㅇ ㅓ 되지야ㅋㅋㅋㅋ",

1) The repetitive word "ㅋㅋㅋㅋ" may be shortened to "ㅋㅋㅋ",

2) The syllable dismantled phrase may be corrected from "미 1 ㅇ ㅓ" to "미어",

3) The word spacing may be corrected from "미어되지야" to "미어 되지야",

4) The emoticon may be recognized, and thus "ㅋㅋㅋ" may be converted into "[joy: ㅋㅋㅋ]", and 5) The misspelling may be corrected from "되지" to "돼지".

Also, when slang or abusive language exists in an inputted utterance, slang or abusive language may be removed.

If the colloquial style of sentence is corrected through the foregoing processes, then the server 10 may analyze morphemes in regard to the corrected utterance and attach parts of speech (S22).

As illustrated in FIG. 12, a word may be divided into morphemes, and thus the corrected sentence "미워 돼지야" may be divided into "밉+어" and " 돼지+야 ".

Thereafter, the parts of speech may be tagged in accordance with the function by the unit of morpheme.

In this example, the parts of speech may be attached like "밉/adjective +어/final ending", "돼지/noun+야/vocative particle".

Thus, when the tagging of the parts of speech is completed, keywords may be extracted (S23). Keywords may be extracted mainly based on substantives.

Besides, in the surface analysis process, the surface factors that are variously defined in regard to utterance may be extracted.

FIG. 14 is a view illustrating surface factors.

Basic morphemes, pairs of words and parts of speech, subjects, length, the last word, verbs, adverbs, auxiliary predicates, formal morphemes or parts of speech may be checked, and factors about abusive language or emoticon are extracted.

When the surface analysis on the last utterance is completed through the foregoing process, the server 10 may perform emotion analysis on the last utterance using the surface analysis result (S30).

In the emotion analysis process on the last utterance, analysis result information on a certain number of previous utterances may be utilized. Specifically, the analysis result information may be used as a factor of machine learning.

In the emotion analysis process, a combination of two values, the emotion type and strength of the corresponding utterance may be returned.

The emotion analysis, after extraction of morphemes and attachment of parts of speech, may be performed by mainly determining whether adverbs appear and considering the type and appearance frequency of adverbs.

The emotion analysis may be performed by analyzing the type and strength of emotion. The type of emotion may be determined according to keywords derived from the surface analysis.

A relevant emotion may be selected from a plurality of predetermined emotion types as illustrated in FIG. 8.

Meanwhile, the following two methodologies may be used in regard to the strength of emotion.

1) Emotion Independence Strength

The emotion independence strength may be a methodology for analyzing only the strength itself regardless of the type of emotion.

For this, an emotion degree adverb dictionary may be constructed in a dictionary.

The emotion degree adverb dictionary may collect representative adverbs of our language, and may add adverbs strengthening emotions appearing in a corpus.

For example, adverbs such as "really, very, extremely, exceedingly, so, quire, and considerably" may be included.

In operation S30, the server 10 may determine whether or not an adverb included in the emotion degree adverb dictionary exists among adverbs appearing in the corresponding utterance.

If an adverb included in the emotion degree adverb dictionary appears, the strength of emotion may be determined as one of "strong", "normal", and "weak" according to the appearance frequency.

For example, when two or more adverbs appear, the strength of emotion may be determined as "strong". On the other hand, when any adverb does not appear, the strength of emotion may be determined as "weak".

2) Emotion Dependence Strength

The emotion dependence strength may be a methodology that analyzes the strength of emotion according to a specific type of emotion.

In case of emotion independence strength, since the degree of emotion is mechanically determined in accordance with whether or not adverbs simply appear, an error that the strength of the corresponding emotion is determined as increasing may occur even though adverbs absolutely irrelevant to the type of emotion appear.

Accordingly, in the emotion dependence strength, an emotion type-adverb correlation dictionary may be constructed.

The emotion type-adverb correlation dictionary may collect adverbs strengthening emotion for each specific type of emotion, and may define values of emotion type-adverb correlation for each adverb.

This construction of emotion type-adverb correlation dictionary may be achieved through machine learning to emotion attachment corpuses.

Meanwhile, when an utterance is inputted, the server 10 may determine emotion degree adverbs appearing in the utterance through the surface analysis on the corresponding utterance, and may separately determine the emotion type of the corresponding utterance.

When the emotion types are determined, correlation values of the emotion degree adverbs appearing in the corresponding utterance and the corresponding emotion types may be added up with a weight.

Also, the strength of emotion may be determined according to the size of the added value.

Even though a plurality emotion degree adverbs appear in the same utterance, a correlation between the adverbs and the emotion type of the corresponding utterance may be small. In this case, since the correlation value is very small, the result value of adding up of the correlation values is also small.

Accordingly, even though emotion degree adverbs simply appear or a plurality of emotion degree adverbs appear, it cannot be seen that the strength of emotion of the corresponding utterance necessarily increases.

That is, the strength of emotion may be determined from the semantic viewpoint by considering the correlation the emotion type and the adverb. Compared to the emotion independence strength, higher accuracy can be ensured.

The server 10 may preferably use the emotion dependence strength, but may use the emotion independence strength or combine the emotion dependence strength and the emotion independence strength.

Meanwhile, when the surface analysis and the emotion analysis about the last utterance are completed, the keywords and the emotion information of the last utterance can be obtained.

Naturally, the emotion information may include the type and strength of emotion of the corresponding utterance.

The server 10 may generate a dialogue context factor including the surface analysis and emotion analysis results on the previous utterances of the last utterance (S40).

FIG. 15 is a view illustrating dialogue context factors.

Instead of recommending stickers with a single utterance, the surface analysis and emotion analysis results on several previous utterances of the last utterance need to be considered in order to define and describe the context of dialogue.

Particularly, in addition to the utterances of one user, the utterances of the other party need to be also considered.

The dialogue context factor illustrated in FIG. 15 may include the surface factors, the emotion information (types and degrees of emotions), and the dialogue act categories of several previous utterances.

Thus, as the dialogue context factors are generated, the server 10 may select stickers to be recommended to the first user using the generated dialogue context factors (S50).

Stickers associated with utterance data matching with the keywords of the last utterance among the utterance data that are already accumulated may be selected. In this case, the stickers may be selected in consideration of the flow of the emotion information included in the dialogue context factor.

When stickers match with the keywords obtained from the surface analysis on the last utterance (e.g., stickers used critical number or more times in the utterance in which the corresponding keywords are included as a result of sticker ID indexing, or stickers having the corresponding keywords as meta data) and are used critical number or more times in the utterance data matching with the flow of emotion information of the last utterance and the previous utterance thereof, the stickers may be considered to be appropriate for contextual attachment to the utterance of the first user or answer to the utterance of the second user.

Thus, when stickers to be recommended are selected, the server 10 may provide information (e.g., sticker ID or sticker graphic data) on the selected stickers for the first user terminal 21 (S60)

Figure 16:
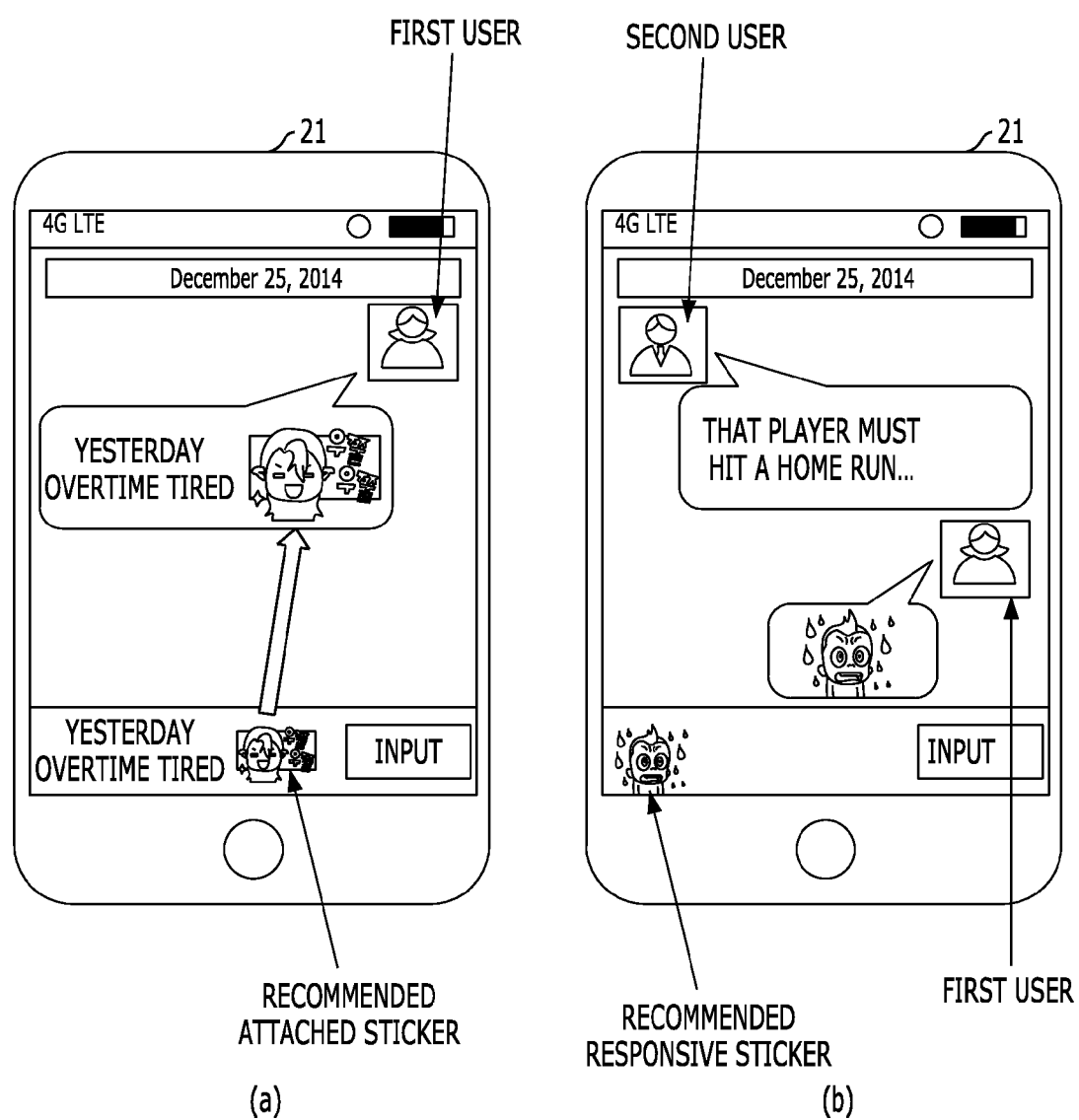
FIG. 16 is a view illustrating stickers recommended to users.

FIG. 16 illustrates stickers recommended to the first user terminal 21 through the foregoing processes.

FIG. 16A illustrates the recommendation of an attached sticker. A sticker that is worthy of attachment to the corresponding utterance for the first user may be recommended through the analysis on texts (last utterance) inputted by the first user. Naturally, the context like the flow of emotion type and strength may be considered including previous utterances of the corresponding utterance.

FIG. 16B illustrates the recommendation of a responsive sticker. The last utterance is an utterance of the second user, "That player must hit a home run . . . ". In this case, a sticker that is worthy of use in response to the last utterance for the first user may be recommended through the analysis on the last utterance of the second user.

Hereinafter, the configuration of the sticker recommendation system through emotion analysis according to the embodiment of the present invention will be described in detail with reference to FIG. 17.

Figure 17:
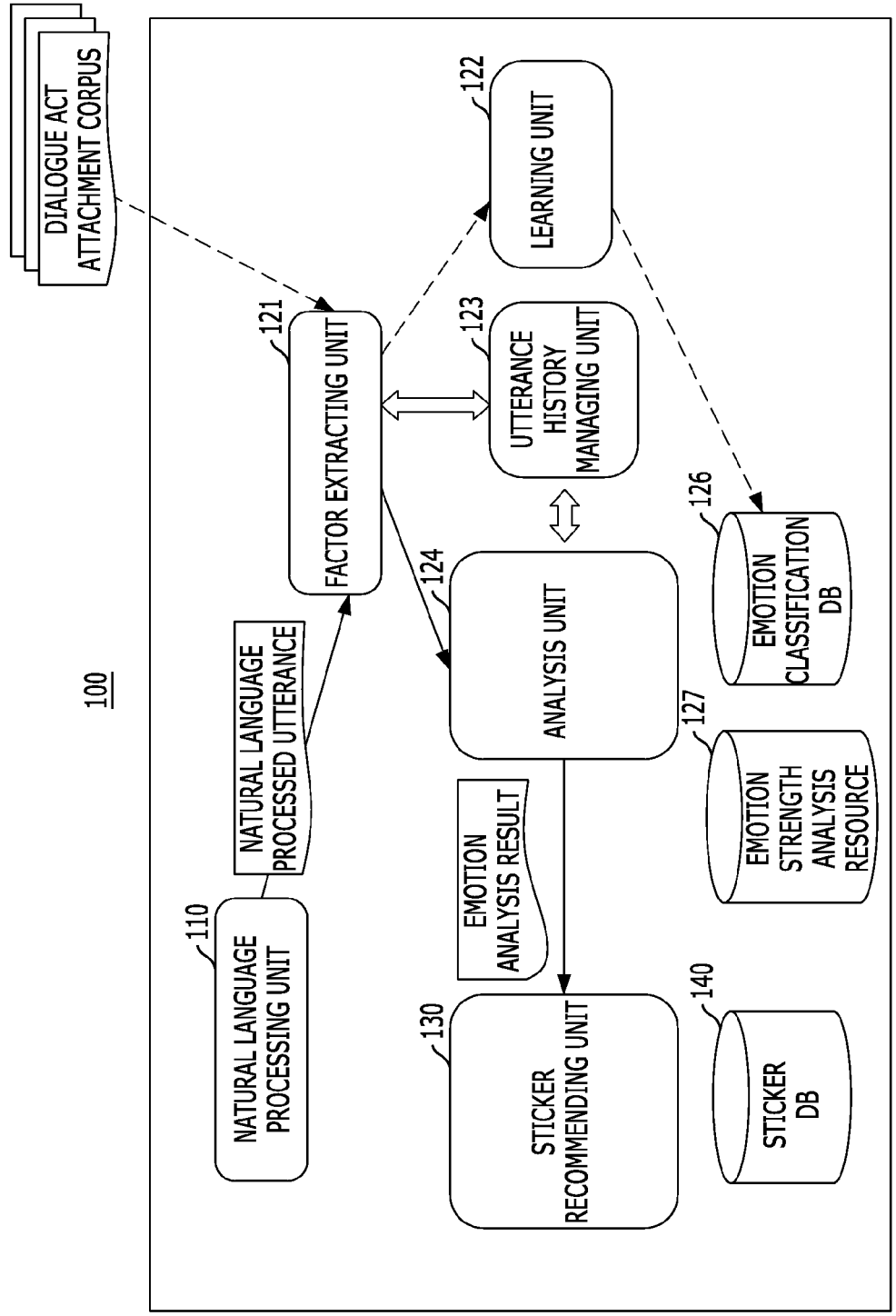
FIG. 17 is a block diagram illustrating the structure of a sticker recommendation system through emotion analysis.

FIG. 17 is a block diagram illustrating the structure of a sticker recommendation system through emotion analysis.

A sticker recommendation system shown in FIG. 17 may be implemented in a form of a server 10. A portion of components may be a form of computer program loaded and executed in the server 10, and another portion of components may be a portion of hardware resources forming the server 10.

As shown in FIG. 17, the sticker recommendation system 100 may include a natural language processing unit 110, a factor extracting unit 121, a learning unit 122, an utterance history managing unit 123, an analysis unit 124, an emotion classification database 126, an emotion strength analysis resource 127, a sticker recommending unit 130, and a sticker database 140.

The natural language process unit 110 may process surface analysis on collected utterances.

The analysis unit 124 may perform emotion analysis on the utterances to determine the type and the strength of emotion. The analysis unit 124 may generate dialogue context factors including the emotion analysis and surface analysis results on the last utterance and the previous continuous several utterances thereof (including utterances of the other party as well as utterances of a specific user).

The emotion classification database 125 may store utterance data that are constructed through learning to emotion attachment corpuses and emotion classification system as illustrated in FIG. 8.

The sticker recommending unit 130 may select stickers to be recommended to the first user using the dialogue context factors.

The learning unit 122 may generate utterance data through emotion tag attachment to corpuses, and may store the utterance data in the emotion classification database 126.

For this, the learning unit 122 may generate dialogue situation information from corpuses to which stickers are attached, and may generate a combination of dialogue situation information-sticker. Also, the learning unit 122 may index the flow of emotion information between continuous utterances, and may index the combination of sticker and input utterance into a sticker ID to store in the emotion classification database 126.

The emotion strength analysis resource 127 may load the emotion degree adverb dictionary or the emotion type-adverb correlation dictionary which are used for the emotion strength analysis. According to the methodologies of the emotion strength analysis, only one or both of the emotion degree adverb dictionary or the emotion type-adverb correlation dictionary may be included.

The utterance history managing unit 123 may manage and store the relationship between a plurality of continuous utterances. When utterances of two or more users are separated and analyzed for each user, the context flow cannot be accurately understood. Accordingly, the precedence relation and connection relation of continuous utterances exchanged between users in dialogue need to be managed.

The sticker database 140 may store a plurality of stickers. Each sticker may have metadata.

The method according to the embodiment of the present invention can also be embodied into a form of program instruction executable through various computer means, and can be recorded on computer readable media. The computer readable media may include program instructions, data files, data structures, or combinations thereof. The program instructions recorded in the media may be what is specially designed and constructed for the present invention, or may be what is well-known to computer software engineers skilled in the art. Examples of computer readable recording media include hard disk, magnetic media such as floppy disks and magnetic tapes, optical media such as CD-ROM and DVD, magneto-optical media such as floptical disk, and hardware devices such as ROM, RAM, and flash memory, which are specially configured so as to store and perform program instructions. Examples of program instructions may include high-level language codes which can be executed by computers using an interpreter and the like, as well as machine language codes which are made by a compiler.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

According to the embodiments, although an identical dialogue content or keyword is inputted, an identical sticker is not necessarily recommended, but an appropriate sticker can be recommended in consideration of the dialogue situation and context. That is, compared to well-known algorithms of automatically recommending a sticker through simple keyword matching, the appropriacy of sticker recommendation can be secured by considering the dialogue situation or context.

Emotion that is not superficially shown but contained in the last dialogue can be considered by considering the emotion and dialogue context, and thus emotion that cannot be expressed by the utterance itself can be supplemented. In addition, since the flow of emotion can be considered instead of momentary emotion superficially shown in a single utterance by analyzing emotion by the unit of dialogue including a plurality of utterances, stickers accurately and naturally matching with the emotion of a user can be recommended.

The present invention can be applied to social network service and messenger technical fields.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of recommending a dialogue sticker group by use of a server that is connected to a database, a first user terminal and a second user terminal through a network and relays an utterance inputted to a messenger between the first user terminal and the second user terminal, the utterance including at least one of a text and an image, the method comprising:
causing the server to analyze utterances, generate utterance data from the analyzed utterances and store the utterance data in the database, the utterance data comprising dialogue situation information, the dialogue situation information including information on dialogue act category, information on emotion category, information on emotion strength of a user, and one or more keywords extracted from the utterances;
analyzing a set of continuous utterances between the first and second user terminals to determine a dialogue situation between the first and second user terminals, the set of continuous utterances including at least one utterance from the first user terminal and at least one utterance from the second user terminal;
retrieving, from the utterance data, a portion of the dialog situation information, wherein the portion has a dialog situation similar to the dialog situation between the first and second user terminals;
determining a relationship between a first user of the first user terminal and a second user of the second user terminal from a set of continuous utterances between the first user terminal and the second user terminal;
selecting a sticker group based on the retrieved portion of the dialog situation information and the determined relationship, the sticker group including one or more stickers; and
recommending the selected sticker group on a display device of the first user terminal.

2. A non-transitory computer readable medium storing one or more sequences of pattern data for recommending a dialogue sticker group by use of a server that is connected to a database, a first user terminal and a second user terminal through a network and relays an utterance inputted to a messenger between the first user terminal and the second user terminal, the utterance including at least one of a text and an image, wherein execution of the one or more sequences of the pattern data by one or more processors causes the one or more processors to perform the steps of:
causing the server to analyze utterances, generate utterance data from the analyzed utterances and store the utterance data in the database, the utterance data comprising dialogue situation information, the dialogue situation information including information on dialogue act category, information on emotion category, information on emotion strength of a user, and one or more keywords extracted from the utterances;
analyzing a set of continuous utterances between the first and second user terminals to determine a dialogue situation between the first and second user terminals, the set of continuous utterances including at least one utterance from the first user terminal and at least one utterance from the second user terminal;
retrieving, from the utterance data, a portion of the dialog situation information, wherein the portion has a dialog situation similar to the dialog situation between the first and second user terminals;
determining a relationship between a first user of the first user terminal and a second user of the second user terminal from a set of continuous utterances between the first user terminal and the second user terminal;

selecting a sticker group based on the retrieved portion of the dialog situation information and the determined relationship, the sticker group including one or more stickers; and recommending the selected sticker group on a display device of the first user terminal.

* * * * *